(12) United States Patent
Lee et al.

(10) Patent No.: US 8,339,947 B2
(45) Date of Patent: Dec. 25, 2012

(54) FLOW-BASED PROACTIVE CONNECTION ADMISSION CONTROL (CAC) IN WIRELESS NETWORKS

(75) Inventors: Jay J. Lee, San Ramon, CA (US); Lee K. Tjio, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 356 days.

(21) Appl. No.: 12/828,810

(22) Filed: Jul. 1, 2010

(65) Prior Publication Data
US 2012/0002541 A1 Jan. 5, 2012

(51) Int. Cl.
H04L 12/26 (2006.01)
(52) U.S. Cl. .................. 370/230; 370/252
(58) Field of Classification Search .......... 370/229–235
See application file for complete search history.

(56) References Cited

U.S. PATENT DOCUMENTS

| | | | |
|---|---|---|---|
| 6,987,729 B1 * | 1/2006 | Gopalakrishnan et al. | ... 370/230 |
| 7,885,186 B2 * | 2/2011 | MacLean et al. | .......... 370/230.1 |
| 2007/0116048 A1 * | 5/2007 | Addington | .................... 370/468 |
| 2009/0042580 A1 * | 2/2009 | Chiricescu et al. | ........... 455/450 |

* cited by examiner

Primary Examiner — Gary Mui

(57) ABSTRACT

A device receives available capacity and used capacity associated with a network, receives a connection request from a user device in the network, and receives a maximum capacity threshold associated with the network. The device calculates a minimum capacity threshold and a medium capacity threshold, associated with the network, based on the maximum capacity threshold. The device also determines whether to admit or deny the connection request based on the available capacity, the used capacity, the minimum capacity threshold, the medium capacity threshold, and the maximum capacity threshold. The device further allocates, when the connection request is to be admitted and based on resource availability associated with the network, a particular bit rate, for a particular quality of service (QoS) class, to the connection request.

25 Claims, 8 Drawing Sheets

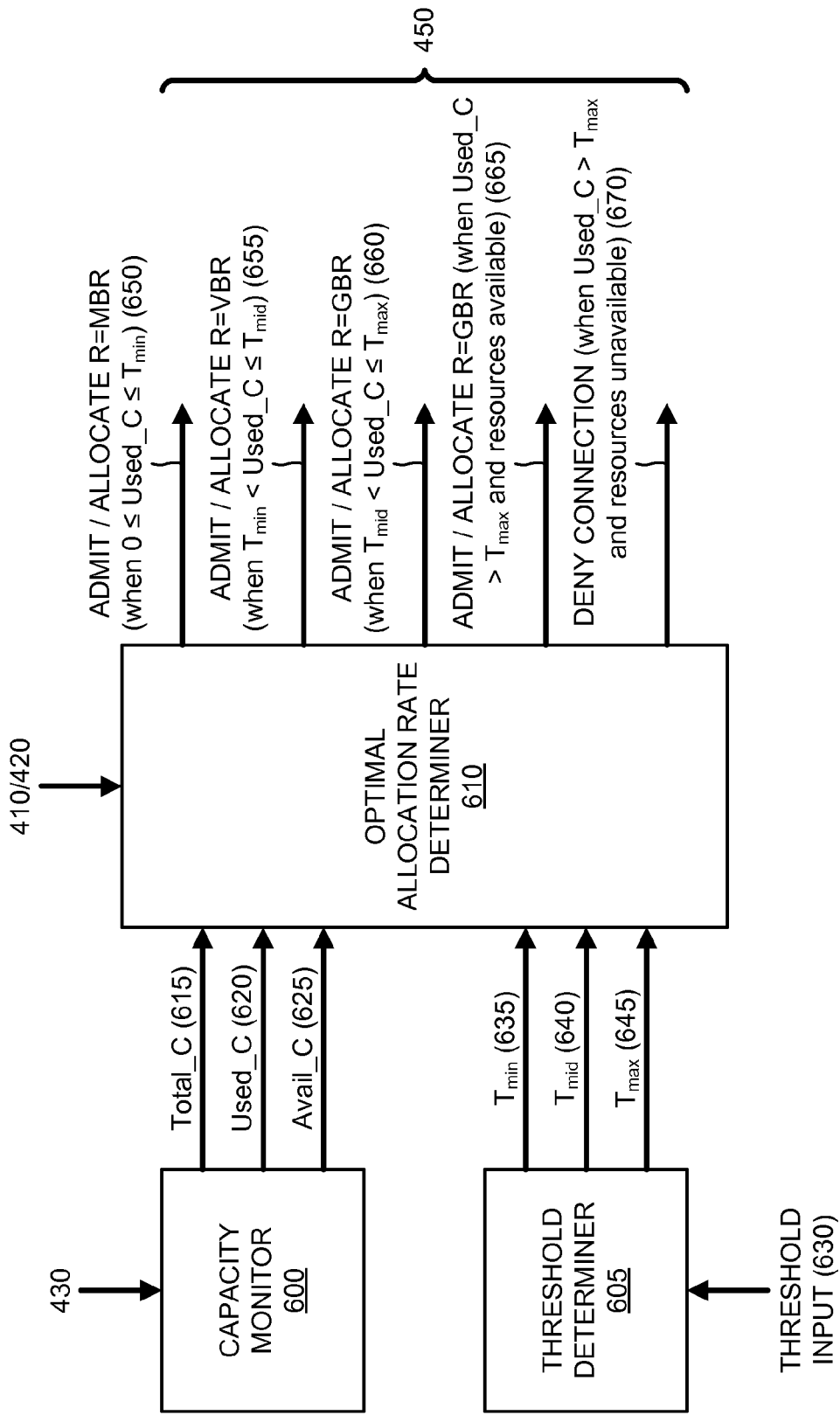

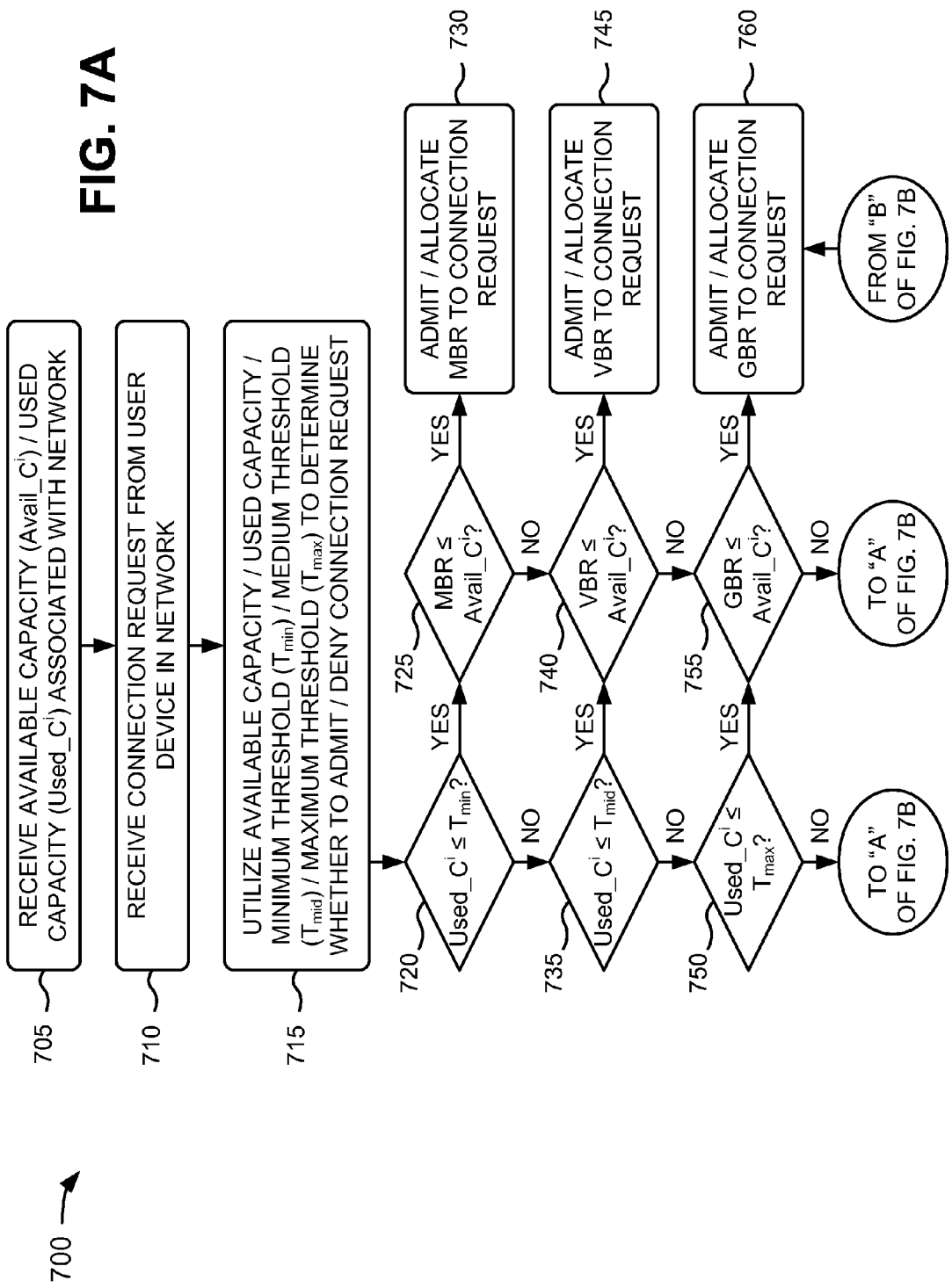

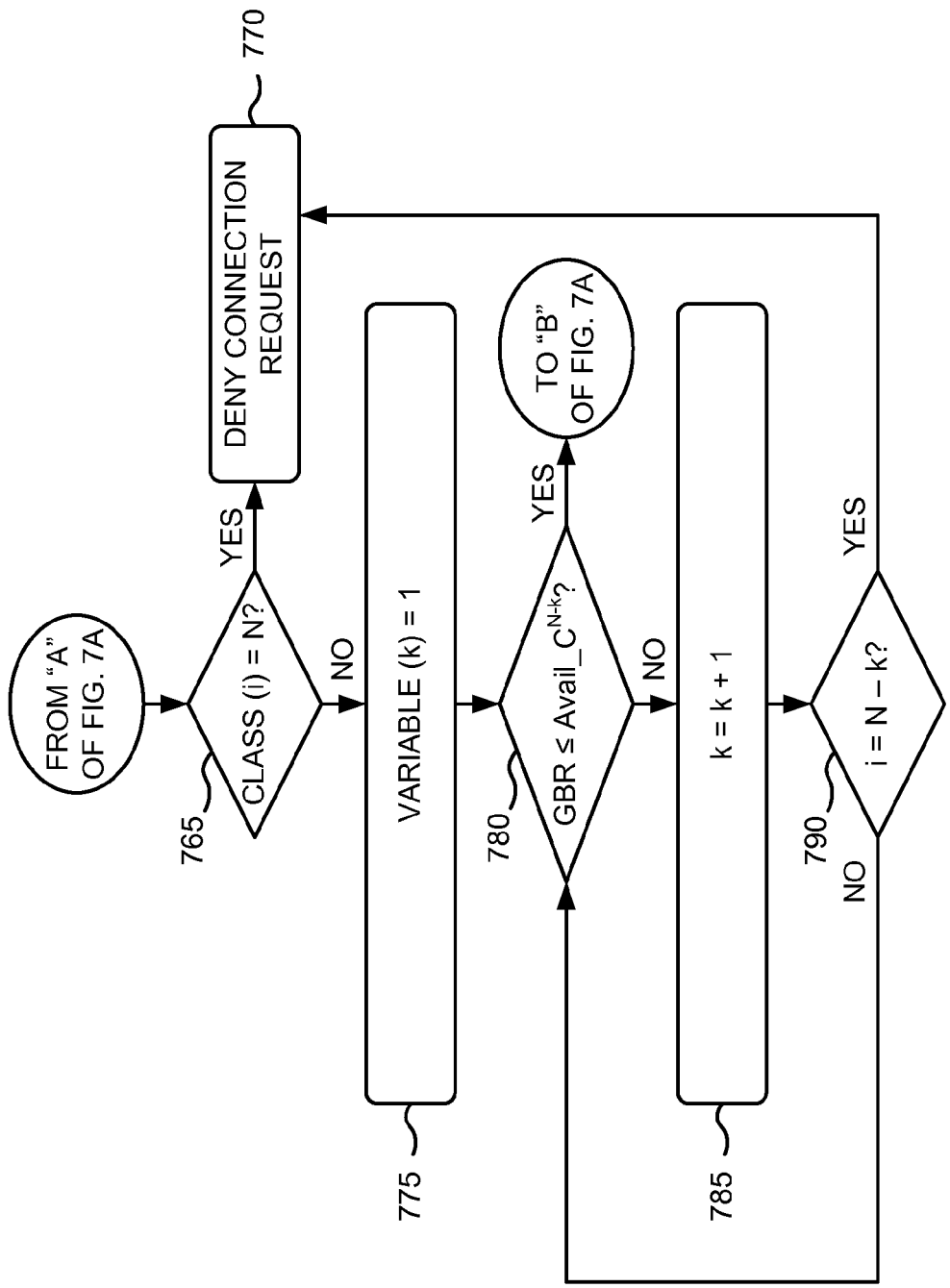

United States Patent US 8,339,947 B2

FLOW-BASED PROACTIVE CONNECTION ADMISSION CONTROL (CAC) IN WIRELESS NETWORKS

BACKGROUND

In the Third Generation Partnership Project (3GPP), the fourth generation (4G) cellular network includes a radio access network (e.g., referred to as a long term evolution (LTE) network) and a wireless core network (e.g., referred to as evolved packet core (EPC) network). The LTE network is often called an evolved universal terrestrial radio access network (E-UTRAN). The EPC network is an all-Internet protocol (IP) packet-switched core network that supports high-speed wireless and wireline broadband access technologies. An evolved packet system (EPS) is defined to include both the LTE and EPC networks. EPS seeks to take mobile technology to the next level through higher bandwidth, better spectrum efficiency, wider coverage, enhanced security, and full interworking with other access networks. EPS proposes doing this using an all-IP architecture.

An admission control mechanism determines whether a new real-time traffic connection can be admitted to a network (e.g., an EPC network) without jeopardizing performance guarantees provided to already-established connections. The objective of connection admission control (CAC) is to guarantee a quality of service (QoS) for all connections in the network, while at the same time making efficient use of network resources (e.g., accommodating as many connections as possible). QoS refers to resource reservation control mechanisms that provide different priorities to different applications, users, and/or traffic (e.g., data flows), or guarantees a certain level of performance (e.g., a required bit rate, delay, jitter, packet dropping probability, and/or bit error rate (BER) may be guaranteed) to traffic. For example, the objective of CAC may be to determine whether a requested connection (e.g., an arriving call), with specified QoS requirements (e.g., packet loss ratio, delay, jitter, etc.), should be admitted to the network. A new connection request is admitted only if the request's QoS constraints can be satisfied without jeopardizing QoS constraints of existing connections in the network.

The implementation of CAC can be quite complex. A first conventional CAC mechanism allocates a specified bandwidth, at each network node (e.g., network resource) along an end-to-end connection path, based on peak rates (PRs) of the connections. A network typically monitors various rates (e.g., peak rates, average rates, and other rates) of applications and connections for its proper dimensioning. Although the first CAC mechanism guarantees a desired QoS along the connection path, the first CAC mechanism requires much wider bandwidth usage than might otherwise be necessary. In other words, under the first CAC mechanism, valuable network resources are wasted without any statistical multiplexing gain.

A second conventional CAC mechanism allocates bandwidth at each node based on average rate (AR) requirements of the connections. While the second CAC mechanism saves network resources by allocating (e.g., to the resources) less than a peak rate requirement, service quality will suffer when some or most of the connections request more than the average rate. This is not ideal because the service quality is subject to the unpredictable traffic conditions of the network (e.g., QoS cannot be guaranteed in some or most cases).

BRIEF DESCRIPTION OF THE DRAWINGS

FIG. 6 is a diagram of example functional components of the PCRF depicted in FIG. 1; and FIGS. 7A and 7B are flow charts of an example process for performing flow-based proactive connection admission control in wireless networks according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that guarantee QoS for connections (e.g., in a network) while making efficient use of resources in the network. The systems and/or methods may allocate a maximum bit rate (MBR) if bandwidth usage is low (e.g., much less than a bandwidth capacity allocated by a network), and may allocate a minimum rate or guaranteed bit rate (GBR) if bandwidth usage is high (e.g., near the bandwidth capacity allocated by the network). For bandwidth usage between the low and high thresholds, the systems and/or methods may determine an allocation rate based on a decreasing relationship between a bandwidth allocation rate and a used bandwidth capacity. If network resources are no longer available in a QoS class, the systems and/or methods may not reject a connection request, but instead may determine whether network resources are available from lower QoS classes and may allocate a GBR, if available. If network resources from the lower QoS classes are not available, the systems and/or methods may reject the connection.

The systems and/or methods may dynamically allocate different bit rates (e.g., via network resource allocation) depending on traffic conditions. The systems and/or methods may be proactive by allocating more network resources when traffic usage is low, gradually increasing network resource allocation as traffic usage increases, and allocating minimum required network resources when traffic usage is high. In this manner, the systems and/or methods may achieve a high level of network resource utilization, while guaranteeing QoS requirements. The systems and/or methods described herein may be applied to any network that utilizes connection admission control (CAC). However, the systems and/or methods may be described in connection with a LTE and EPC network architecture.

Figure 1:
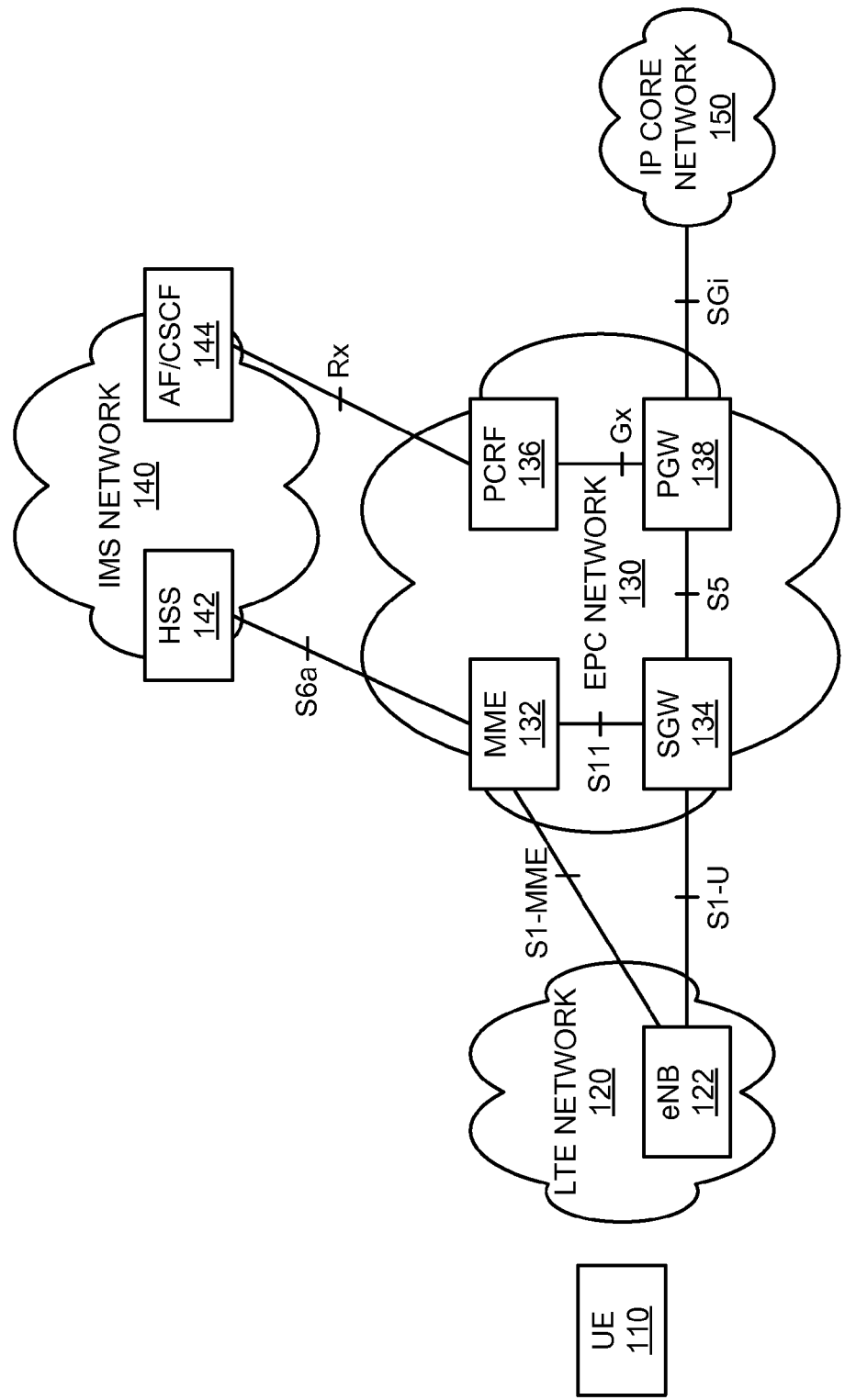
FIG. 1 is a diagram of an example network in which systems and/or methods described herein may be implemented.

FIG. 1 is a diagram of an example network 100 in which systems and/or methods described herein may be implemented. As illustrated, network 100 may include a user equipment (UE) 110, a LTE network 120, an EPC network 130, an IMS network 140, and an IP core network 150. LTE network 120 may include an eNodeB (eNB) 122. EPC network 130 may include a mobility management entity (MME) 132, a serving gateway (SGW) 134, a policy and charging rule function (PCRF) 136, and a packet data network (PDN) gateway (PGW) 138. IMS network 140 may include a home subscriber server (HSS) 142 and an application function/call session control function (AF/CSCF) 144. Devices/networks of network 100 may interconnect via wired and/or wireless connections.

A single UE 110, LTE network 120, eNB 122, EPC network 130, MME 132, SGW 134, PCRF 136, PGW 138, IMS network 140, HSS 142, AF/CSCF 144, and IP core network 150 have been illustrated in FIG. 1 for simplicity. In practice, there may be more UEs 110, LTE networks 120, eNBs 122, EPC networks 130, MMEs 132, SGWs 134, PCRFs 136, PGWs 138, IMS networks 140, HSSs 142, AF/CSCFs 144, and/or IP core networks 150. Also, in some instances, one or more of the components of network 100 may perform one or more functions described as being performed by another one or more of the components of network 100. As further shown in FIG. 1, eNB 122 may interface with MME 132 over a S1-MME interface, and may interface with SGW 134 over a S1-U interface. MME 132 may interface with SGW 134 over a S11 interface, and may interface with HSS 142 over a S6a interface. SGW 134 may interface with PGW 138 over a S5 interface. PCRF 136 may interface with PGW 138 over a Gx interface, and may interface with AF/CSCF 144 over a Rx interface. PGW 138 may interface with IP core network 150 over a SGi interface.

UE 110 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, a landline telephone, or other types of computation or communication devices. In an example implementation, UE 110 may include a device that is capable of communicating over LTE network 120, EPC network 130, IMS network 140, and/or IP core network 150.

LTE network 120 may include a communications network that connects subscribers (e.g., UE 110) to a service provider. In one example, LTE network 120 may include a WiFi network or other access networks (e.g., an E-UTRAN or an enhanced high-rate packet data (eHRPD) network). In another example, LTE network 120 may include a radio access network capable of supporting high data rate, low latency, packet optimization, large capacity and coverage, etc.

eNB 122 may include one or more computation and/or communication devices that receive voice and/or data from MME 132 and/or SGW 134 and transmit that voice and/or data to UE 110. eNB 122 may also include one or more devices that receive voice and/or data from UE 110 and transmit that voice and/or data to one of MME 132 and/or SGW 134 or to other UEs 110. eNB 122 may combine the functionalities of a base station and a radio network controller (RNC) in 2G or 3G radio access networks.

EPC network 130 may include a core network architecture of the 3GPP LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140.

MME 132 may include one or more computation and/or communication devices that may be responsible for idle mode tracking and paging procedures (e.g., including retransmissions) for UE 110. MME 132 may be involved in a bearer activation/deactivation process (e.g., for UE 110) and may choose a SGW for UE 110 at an initial attach and at a time of intra-LTE handover. MME 132 may authenticate UE 110 (e.g., via interaction with HSS 142). Non-access stratum (NAS) signaling may terminate at MME 132 and MME 132 may generate and allocate temporary identities to UEs (e.g., UE 110). MME 132 may check authorization of UE 110 to camp on a service provider's Public Land Mobile Network (PLMN) and may enforce roaming restrictions for UE 110. MME 132 may be a termination point in EPC network 130 for ciphering/integrity protection for NAS signaling and may handle security key management. MME 132 may provide a control plane function for mobility between LTE and access networks with a S3 interface terminating at MME 132. MME 132 may also terminate a S6a interface towards HSS 142 for roaming UEs.

SGW 134 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, SGW 134 may route and forward user data packets, may act as a mobility anchor for a user plane during inter-eNB handovers, and may act as an anchor for mobility between LTE and other 3GPP technologies. For idle state UEs, SGW 134 may terminate a downlink (DL) data path and may trigger paging when DL data arrives for UE 110. SGW 134 may manage and store contexts associated with UE 110 (e.g., parameters of an IP bearer service, network internal routing information, etc.).

PCRF 136 may include one or more computation or communication devices that may provide policy control decision and flow based charging control functionalities. PCRF 136 may provide network control regarding service data flow detection, gating, QoS and flow based charging, etc. PCRF 136 may determine how a certain service data flow shall be treated, and may ensure that user plane traffic mapping and treatment is in accordance with a user's subscription profile. Further details of PCRF 136 are provided below in connection with one or more of FIGS. 2-7B.

PGW 138 may include one or more data transfer devices (or network devices), such as a gateway, a router, a switch, a firewall, a NIC, a hub, a bridge, a proxy server, an OADM, or some other type of device that processes and/or transfers data. In one example implementation, PGW 138 may provide connectivity of UE 110 to external packet data networks (e.g., to IP core network 150) by being a traffic exit/entry point for UE 110. UE 110 may simultaneously connect to more than one PGW for accessing multiple PDNs. PGW 138 may perform policy enforcement, packet filtering for each user, charging support, lawful intercept, and packet screening. PGW 138 may also act as an anchor for mobility between 3GPP and non-3GPP technologies.

IMS network 140 may include an architectural framework or network (e.g., a telecommunications network) for delivering IP multimedia services.

HSS 142 may include one or more computation or communication devices that gather, process, search, and/or provide information in a manner described herein. In one example implementation, HSS 142 may include a master user database that supports devices of IMS network 140 that handle calls. HSS 142 may contain subscription-related information (e.g., subscriber profiles), may perform authentication and authorization of a user, and may provide information about a subscriber's location and IP information.

AF/CSCF 144 may include one or more computation or communication devices that gather, process, search, and/or provide information in a manner described herein. In one example implementation, AF/CSCF 144 may interact or intervene with applications that require dynamic policy and charging control. AF/CSCF 144 may extract session information and may provide the session information to PCRF 136 (e.g., over the Rx interface). In one example, AF/CSCF 144 may be a central component for signaling and control within IMS network 140. AF/CSCF 144 may be responsible for signaling via session initiation protocol (SIP) between the transport plane, control plane, and application plane of IMS network 144.

IP core network 150 may include one or more IP-based networks (e.g., a local area network (LAN), a wide area network (WAN), a metropolitan area network (MAN), the Internet, etc.) capable of communicating with UE 110.

Although FIG. 1 shows example devices/networks of network 100, in other implementations, network 100 may contain fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
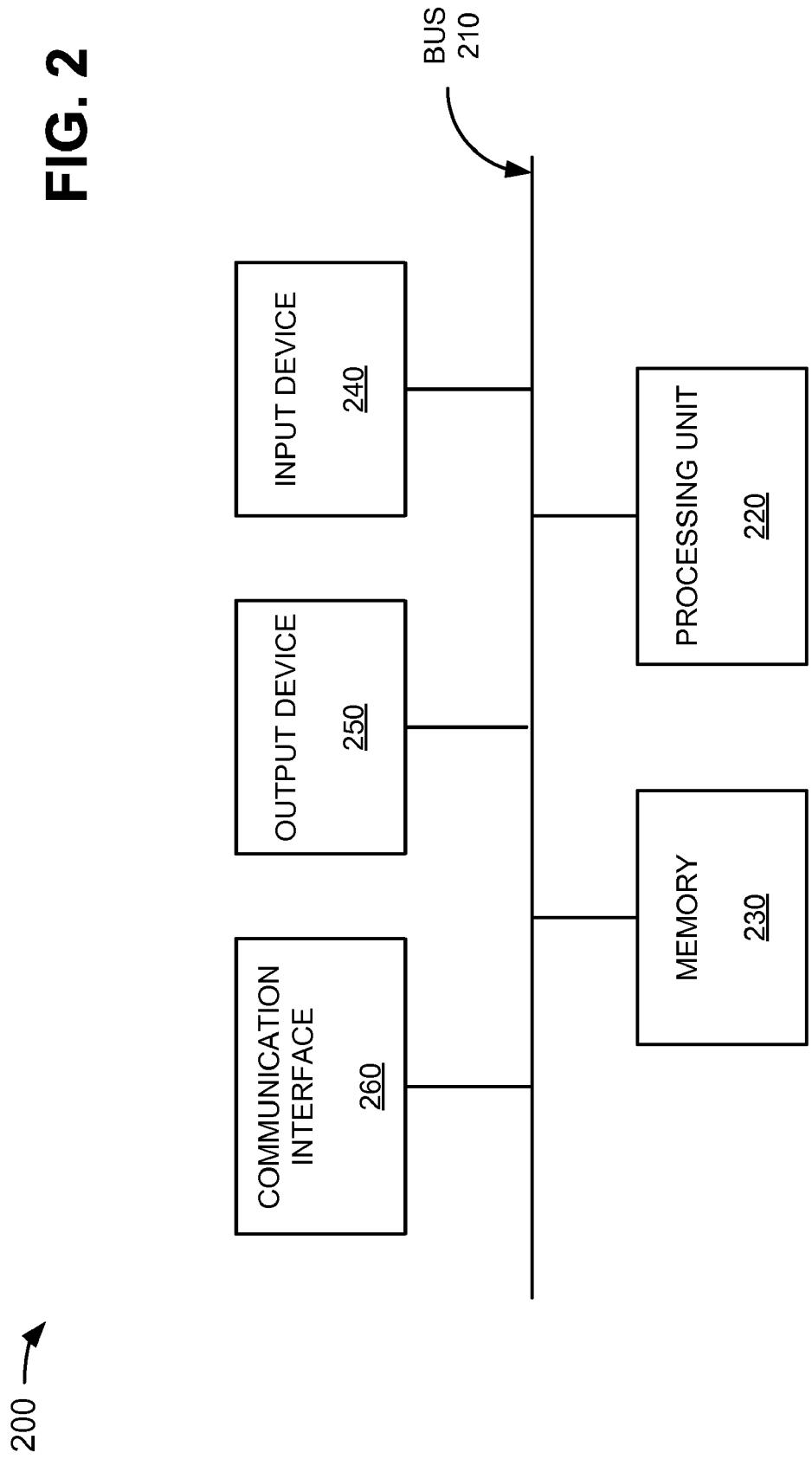
FIG. 2 is a diagram of example components of a device that may correspond to one of the devices of the network depicted in FIG. 1.

FIG. 2 is a diagram of example components of a device 200 that may correspond to one of the devices of network 100. One or more of the devices depicted in FIG. 3 (and described below) may contain comparable configurations. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

In an example implementation, a QoS scheme in a LTE/EPC-based network (e.g., network 100) may define two rates specific to QoS attributes: a guaranteed bit rate (GBR) and a maximum bit rate (MBR). The GBR may specify a minimum guaranteed bit rate for bearer services and may include a bit rate on which admission control decisions are based. The MBR may specify a maximum bit rate for bearer services that users (e.g., of UE 110) may utilize (if available). A CAC mechanism described herein may admit a connection when there are enough resources (e.g., in network 100) to provide at least a bit rate specified in the GBR. The connection may then use bit rates up to the MBR (if available). In one example implementation, the CAC mechanism may be implemented in PCRF 136.

Figure 3:
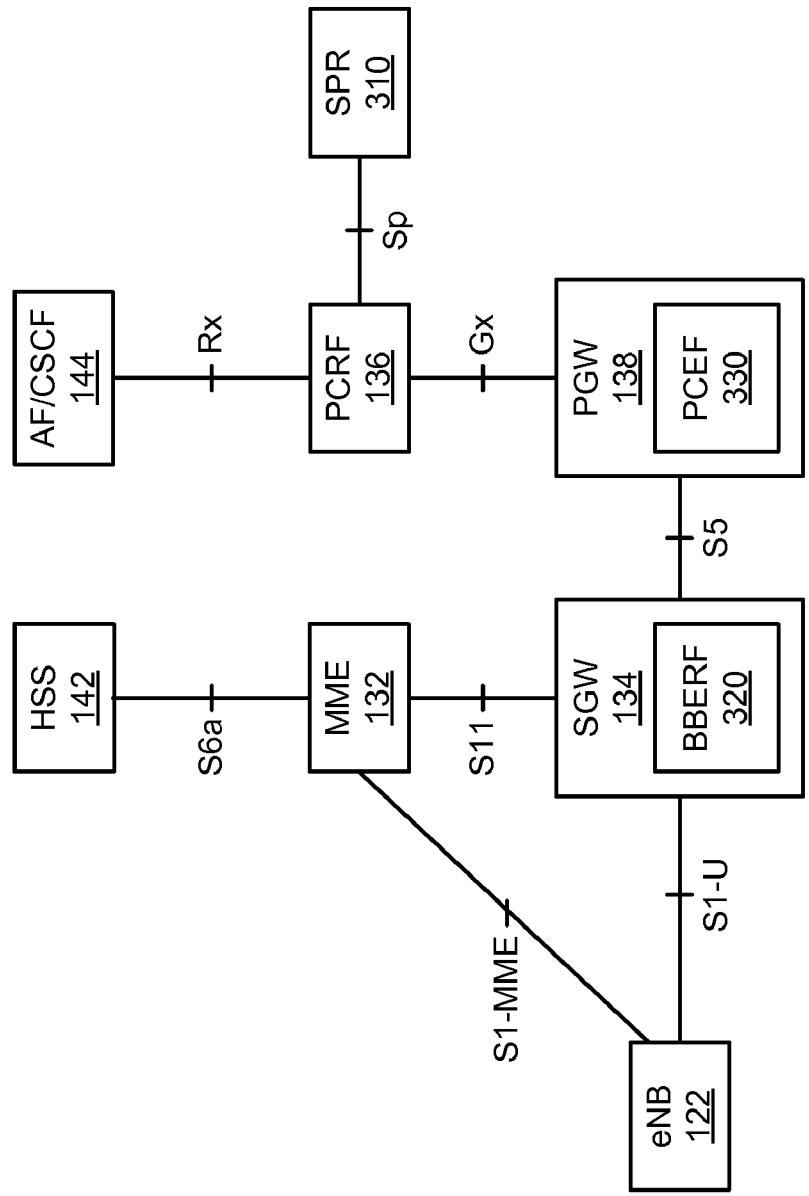
FIG. 3 is a diagram of an example policy and charging control (PCC) architecture of the network depicted in FIG. 1.

PCRF 136 may be provided in a policy and charging control (PCC) architecture 300 (e.g., of network 100), as shown in FIG. 3. PCC architecture 300 may enable operators (e.g., of network 100) to provide QoS to subscribers (e.g., users of UEs 110) for IP-based services, and to charge for network resources provided based on the users' subscription information and other policy information. As shown in FIG. 3, PCC architecture 300 may include eNB 122, MME 132, SGW 134, PCRF 136, PGW 138, HSS 142, AF/CSCF 144, and a subscription profile repository (SPR) 310. As further shown in FIG. 3, SGW 134 may include a bearer binding and event reporting function (BBERF) 320 and PGW 138 may include a policy and charging enforcement function (PCEF) 330. eNB 122, MME 132, SGW 134, PCRF 136, PGW 138, HSS 142, and AF/CSCF 144 may include the features described above in connection one or more of FIGS. 1 and 2.

SPR 310 may include one or more computation or communication devices that gather, process, search, and/or provide information in a manner described herein. In one example implementation, SPR 310 may include QoS and charging subscription profiles for users of network 100 (e.g., users of UEs 110).

PCRF 136 may be a central entity of PCC architecture 300. PCRF 136 may make policy and charging control decisions for UE 110 (not shown) upon request, may provide charging and QoS rules to PCEF 330 over the Gx interface, and may provide the QoS rules to BBERF 320 for enforcement. The charging rules may contain charging rates and information to identify data flows. The QoS rules may contain QoS behavior to be enforced (e.g., a QoS class indicator, a MBR, an aggregate MBR (AMBR), etc.) and information to identify data flows. PCRF 136 may make the policy and charging control decisions based on a variety of inputs provided by different sources. For example, PCRF 136 may make policy and charging control decisions based on operator configuration information (e.g., provided to PCRF 136) that defines policies given to services; subscription information (e.g., provided by SPR 310) for a given user (e.g., of UE 110); information (e.g., provided by AF/CSCF 144 or a proxy-CSCF associated with IMS network 130) associated with a service; information (e.g., provided by LTE network 120) about access technology utilized by LTE network 120; etc.

BBERF 320 (e.g., of SGW 134) may apply the QoS rules to service data flows in LTE network 120, and may apply binding of IP flows to access bearers.

PCEF 330 (e.g., of PGW 138) may enforce policy decisions received from PCRF 136 (e.g., via the Gx interface), and may provide PCRF 136 with user and access specific information (e.g., via the Gx interface).

Although FIG. 3 shows example components of PCC architecture 300, in other implementations, PCC architecture 300 may contain fewer components, different components, differently arranged components, or additional components than depicted in FIG. 3. Alternatively, or additionally, one or more components of PCC architecture 300 may perform one or more other tasks described as being performed by one or more other components of PCC architecture 300.

Figure 4:
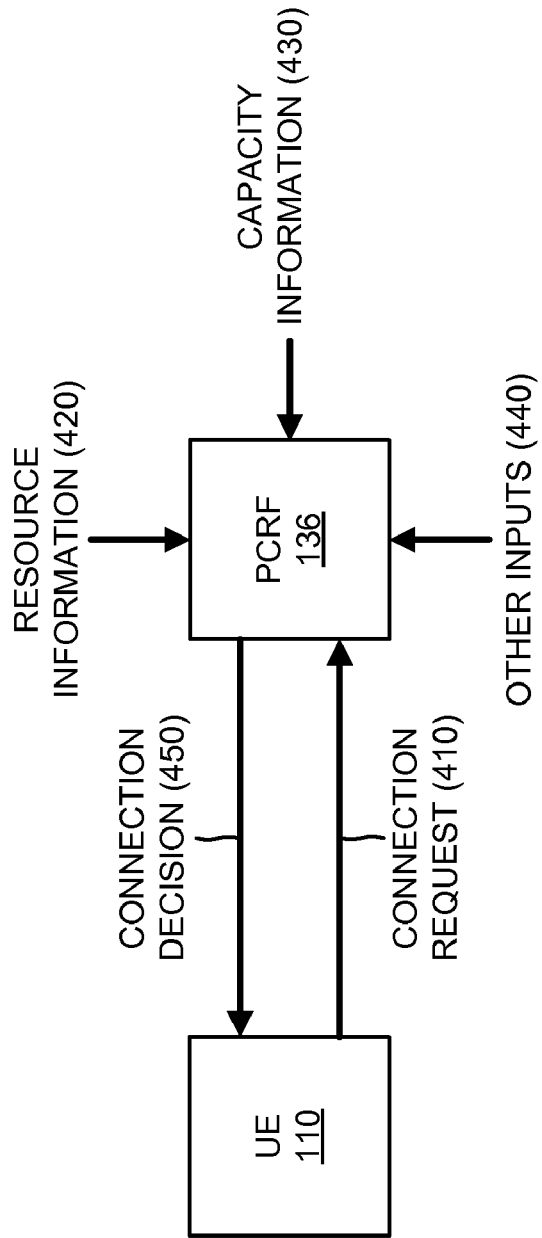
FIG. 4 is a diagram of example interactions among components of an example portion of the network depicted in FIG. 1.

FIG. 4 is a diagram of example interactions among components of an example portion 400 of network 100. As shown, example network portion 400 may include UE 110 and PCRF 136. UE 110 and PCRF 136 may include the features described above in connection with one or more of FIGS. 1-3.

As further shown in FIG. 4, UE 110 may provide a connection request 410 to PCRF 136, and PCRF 136 may receive connection request 410. Connection request 410 may include a request to connect (e.g., in order to place a call, access the Internet, etc.) to a network (e.g., network 100), QoS requirements for the connection, etc. PCRF 136 may receive resource information 420 (e.g., associated with network 100), capacity information 430 (e.g., associated with network 100), and other inputs 440. Resource information 420 may include information associated with resources of network 100, such as make and model information associated with components of network 100, access technology utilized by LTE network 120, etc. Capacity information 430 may include available capacity associated with resources of network 100, used capacity associated with resources of network 100, total capacity associated with resources of network 100, etc. Other inputs 440 may include operator configuration information that defines policies given to services; subscription information for a given user (e.g., of UE 110); information associated with a service; information about access technology utilized by LTE network 120; etc.

PCRF 136 may determine whether to permit or deny connection request 410 based on resource information 420, capacity information 430, and/or other inputs 440, and may generate the determination as connection decision 450. As further shown in FIG. 4, PCRF 136 may provide connection decision 450 to UE 110. In one example, UE 110 may be admitted (or connected) to network 100 (e.g., to utilize resources of network 100) based on connection decision 450. Alternatively, UE 110 may be denied access to network 100 based on connection decision 450.

In one example implementation, PCRF 136 may utilize capacity thresholds to determine whether to permit or deny connection request 410. For example, when the used capacity (e.g., of network resources) is below a minimum level of capacity (e.g., a minimum capacity threshold, $T_{min}$), PCRF 136 may permit connection request 410 and may attempt to allocate as much bandwidth possible (e.g., a MBR) to connection request 410 (e.g., if the MBR is less than or equal to the available capacity of network 100).

When the used capacity (e.g., of network resources) is between the minimum capacity threshold ($T_{min}$) and a medium capacity threshold ($T_{mid}$), PCRF 136 may permit connection request 410 and may allocate bandwidth (e.g., to connection request 410) at a variable bit rate (VBR) (e.g., if the VBR is less than or equal to the available capacity of network 100). The VBR may be a decreasing function of the used capacity (e.g., as the used capacity increases, the VBR may decrease). The VBR function may include any decreasing function of the used capacity, such as a linearly decreasing function, a logarithmically decreasing function, an exponentially decreasing function, a decreasing step function, etc. (e.g., depending on an operator's preference). As described herein, for example, the VBR function may include a linearly decreasing function.

When the used capacity (e.g., of network resources) is between the medium capacity threshold ($T_{mid}$) and a maximum capacity threshold ($T_{max}$), PCRF 136 may permit connection request 410 and may allocate bandwidth (e.g., to connection request 410) at a minimum guaranteed bit rate (GBR) that resources of network 100 may provide (e.g., if the GBR is less than or equal to the available capacity of network 100).

When the used capacity (e.g., of network resources) is greater than the maximum capacity threshold ($T_{max}$), PCRF 136 may determine if other (e.g., lower QoS) classes of network 100 have available resources to permit connection request 410. If the lower QoS classes of network 100 have resources available, PCRF 136 may permit connection request 410 and may allocate bandwidth (e.g., to connection request 410) at the GBR (e.g., if the GBR is less than or equal to the available capacity of the lower QoS classes of network 100). If the lower QoS classes of network 100 do not have resources available, PCRF 136 may deny connection request 410.

Although FIG. 4 shows example components of network portion 400, in other implementations, network portion 400 may contain fewer components, different components, differently arranged components, or additional components than depicted in FIG. 4. Additionally, or alternatively, one or more components of network portion 400 may perform one or more other tasks described as being performed by one or more other components of network portion 400.

Figure 5:
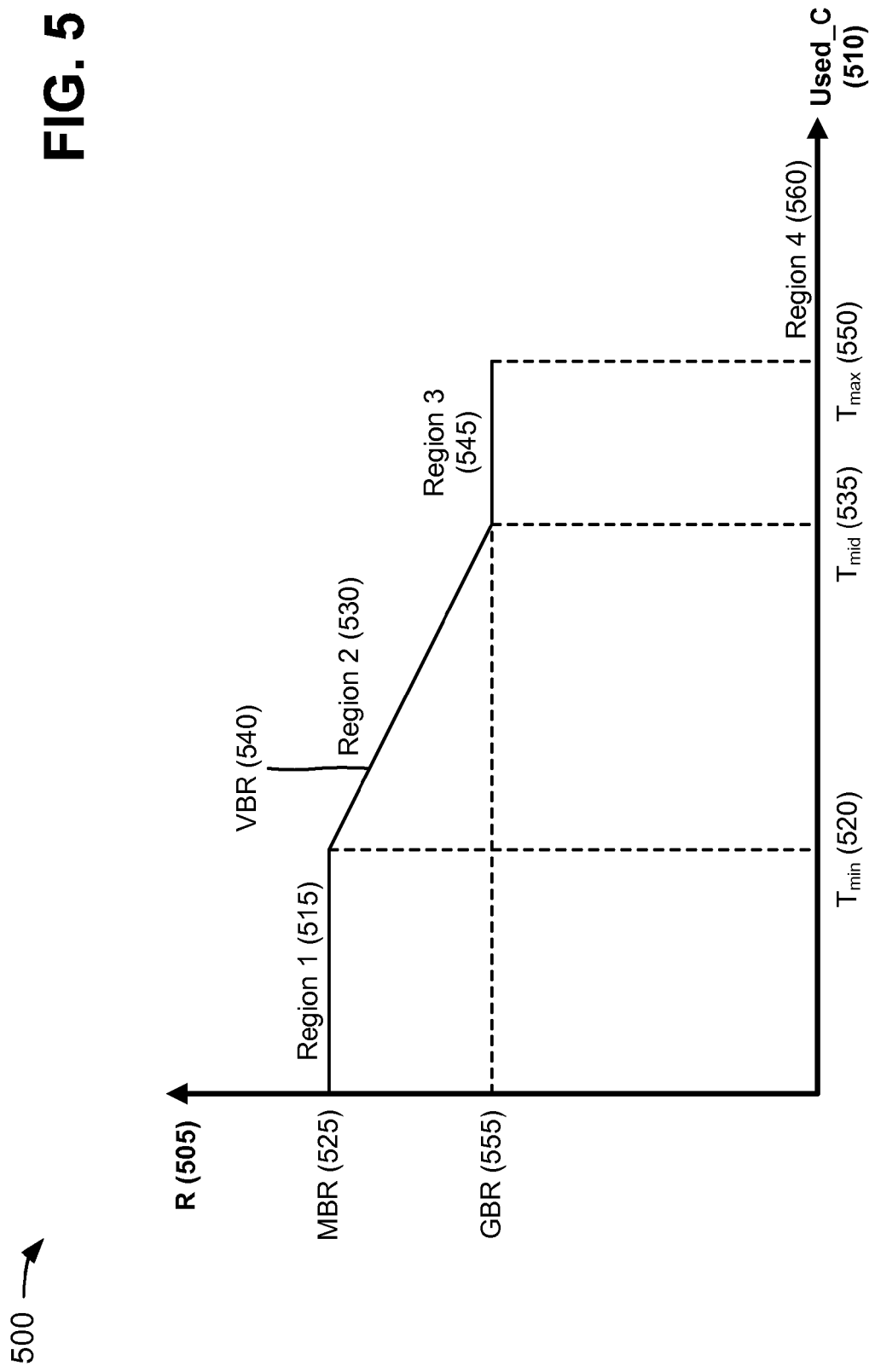
FIG. 5 is a diagram of example bandwidth allocation rules and regions capable of being implemented by a policy and charging rule function (PCRF) depicted in FIG. 1.

FIG. 5 is a diagram 500 of example bandwidth allocation rules and regions capable of being implemented by PCRF 136. As shown, diagram 500 may include a bandwidth allocation rate (R) axis 505 and a used capacity (Used_C) (e.g., of resources of network 100) axis 510. In a first region 515 (e.g., of a particular QoS class), the used capacity (e.g., of network resources) may be below a minimum capacity threshold ($T_{min}$) 520. In first region 515, PCRF 136 may attempt to allocate as much bandwidth possible (e.g., a MBR 525) to a connection request (e.g., if MBR 525 is less than or equal to the available capacity of network 100).

In a second region 530 (e.g., of the particular QoS class), the used capacity (e.g., of network resources) may be between minimum capacity threshold ($T_{min}$) 520 and a medium capacity threshold ($T_{mid}$) 535. In second region 530, PCRF 136 may allocate bandwidth (e.g., to a connection request) at a variable bit rate (VBR) 540 (e.g., if VBR 540 is less than or equal to the available capacity of network 100). As shown in FIG. 5, VBR 540 may include a linearly decreasing function.

In a third region 545 (e.g., of the particular QoS class), the used capacity (e.g., of network resources) may be between medium capacity threshold ($T_{mid}$) 535 and a maximum capacity threshold ($T_{max}$) 550. In third region 545, PCRF 136 may allocate bandwidth (e.g., to a connection request) at a minimum guaranteed bit rate (GBR) 555 that resources of network 100 may provide (e.g., if GBR 555 is less than or equal to the available capacity of network 100).

In a fourth region 560 (e.g., of the particular QoS class), the used capacity (e.g., of network resources) may be greater than maximum capacity threshold ($T_{max}$) 550. In fourth region 560, PCRF 136 may determine if other (e.g., lower QoS) classes of network 100 have available resources to permit a connection request. If the lower QoS classes of network 100 have resources available, PCRF 136 may permit the connection request and may allocate bandwidth (e.g., to the connection request) at GBR 555 (e.g., if GBR 555 is less than or equal to the available capacity of the lower QoS classes of network 100). If the lower QoS classes of network 100 do not have resources available, PCRF 136 may deny the connection request.

Although FIG. 5 shows example bandwidth allocation rules and regions, in other implementations, fewer bandwidth allocation rules/regions, different bandwidth allocation rules/regions, or additional bandwidth allocation rules/regions, than depicted in FIG. 5, may be utilized by PCRF 136.

FIG. 6 is a diagram of example functional components of PCRF 136. In one example, the functional components described in connection with FIG. 5 may be implemented by one or more of the components depicted in FIG. 2. As shown, PCRF 136 may include a capacity monitor 600, a threshold determiner 605, and an optimal allocation rate determiner 610.

Capacity monitor 600 may include hardware or a combination of hardware and software that may receive capacity information 430 associated with network 100. Based on capacity information 430, capacity monitor 600 may determine a total capacity (Total_C) 615 of resources in network 100, a used capacity (Used_C) 620 of resources in network 100, and an available capacity (Avail_C) 625 of resources in network 100. In one example, it may be assumed that there are a number (N) of QoS classes (i=1, 2, ..., N) associated with network 100 (e.g., numbered from highest to lowest priority classes). Total capacity (Total_C) 615 may be divided into N classes, with each class (i) having a total capacity of Total_$C^i$, and may be calculated (e.g., by capacity monitor 600) as follows:

$$\text{Total\_C} = \sum_{i=1}^{N} \text{Total\_C}^i.$$

Similarly, used capacity (Used_C) 620 may be calculated (e.g., by capacity monitor 600) as follows:

$$\text{Used\_C} = \sum_{i=1}^{N} \text{Used\_C}^i.$$

Available capacity (Avail_C) 625 may be calculated (e.g., by capacity monitor 600) as follows:

$$\text{Avail\_C} = \sum_{i=1}^{N} \text{Avail\_C}^i.$$

As further shown in FIG. 6, capacity monitor 600 may provide total capacity 615, used capacity 620, and available capacity 625 to optimal allocation rate determiner 610. Total capacity 615, used capacity 620, and available capacity 625 may be associated according to the following equations:

$$\text{Total\_C} = \text{Used\_C} + \text{Avail\_C}$$

$$\text{Total\_C}^i = \text{Used\_C}^i + \text{Avail\_C}^i, \text{ for all classes } (i).$$

Threshold determiner 605 may include hardware or a combination of hardware and software that may receive a threshold input 630 (e.g., from an operator), and may determine a minimum capacity threshold ($T_{min}$) 635, a medium capacity threshold ($T_{mid}$) 640, and a maximum capacity threshold ($T_{max}$) 645 based on threshold input 630. In one implementation, threshold determiner 605 may determine the three thresholds (e.g., $T_{min}$, $T_{mid}$, and $T_{max}$) for each QoS class (i). The values of the three thresholds may be determined by an operator (e.g., and input to PCRF 136 via threshold input 630) to suit requirements of network 100. In one example, threshold input 630 may define a particular value for maximum capacity threshold ($T_{max}$) 645. Threshold determiner 605 may utilize maximum capacity threshold ($T_{max}$) 645 to establish minimum capacity threshold ($T_{min}$) 635 as $\frac{1}{3} \cdot T_{max}$ and medium capacity threshold ($T_{mid}$) 640 as $\frac{2}{3} \cdot T_{max}$. As further shown in FIG. 6, threshold determiner 605 may provide minimum capacity threshold 635, medium capacity threshold 640, and maximum capacity threshold 645 to optimal allocation rate determiner 610.

Optimal allocation rate determiner 610 may include hardware or a combination of hardware and software that may receive connection request 410 and resource information 420. Optimal allocation rate determiner 610 may receive total capacity 615, used capacity 620, and available capacity 625 from capacity monitor 600, and may receive minimum capacity threshold 635, medium capacity threshold 640, and maximum capacity threshold 645 from threshold determiner 605. Based on the received information, optimal allocation rate determiner 610 may determine whether to admit or deny connection request 410, and (if connection request 410 is to be admitted) may determine an optimal bit rate (R) to allocate to connection request 410.

In one example implementation, optimal allocation rate determiner 610 may (if connection request 410 is to be admitted) allocate the optimal bit rate (R) depending on how much capacity is used at any given time. For example, when used capacity (Used_C) 620 is greater than or equal to zero (0) and less than or equal to minimum capacity threshold ($T_{min}$) 635, optimal allocation rate determiner 610 may admit connection request 410 and may attempt to allocate as much bandwidth as possible (e.g., R=MBR) to connection request 410 (e.g., if the MBR is less than or equal to available capacity (Avail_C) 625), as indicated by reference number 650.

When used capacity (Used_C) 620 is greater than minimum capacity threshold ($T_{min}$) 635 and less than or equal to medium capacity threshold ($T_{mid}$) 640, optimal allocation rate determiner 610 may admit connection request 410 and may allocate bandwidth (e.g., to connection request 410) at a variable bit rate (e.g., R=VBR) (e.g., if the VBR is less than or equal to available capacity (Avail_C) 625), as indicated by reference number 655. In one example implementation, the VBR may be calculated according to the following equation:

$$VBR = \left( \frac{GBR - MBR}{T_{mid} - T_{min}} \right) \cdot \text{Used\_C} + \left( \frac{MBR \cdot T_{mid} - GBR \cdot T_{min}}{T_{mid} - T_{min}} \right).$$

The VBR may be a decreasing function between two points, ($T_{mid}$, MBR) and ($T_{max}$, GBR), and may include any type (e.g., linear, logarithmic, exponential, etc.) of decreasing function between these two points.

When used capacity (Used_C) 620 is greater than medium capacity threshold ($T_{mid}$) 640 and less than or equal to maximum capacity threshold ($T_{max}$) 645, optimal allocation rate determiner 610 may admit connection request 410 and may allocate bandwidth (e.g., to connection request 410) at a minimum guaranteed bit rate (e.g., R=GBR) (e.g., if the GBR is less than or equal to available capacity (Avail_C) 625), as indicated by reference number 660.

When used capacity (Used_C) 620 is greater than maximum capacity threshold ($T_{max}$) 645, optimal allocation rate determiner 610 may determine if other (e.g., lower QoS) classes of network 100 have available resources to permit connection request 410. If the lower QoS classes of network 100 have resources available, optimal allocation rate determiner 610 may admit connection request 410 and may allocate bandwidth (e.g., to connection request 410) at the GBR (e.g., if the GBR is less than or equal to the available capacity of the lower QoS classes of network 100), as indicated by reference number 665. If the lower QoS classes of network 100 do not have resources available, optimal allocation rate determiner 610 may deny connection request 410, as indicated by reference number 670. As further shown in FIG. 6, one or more of reference numbers 650-670 may correspond to connection decision 450 (FIG. 4).

In one example implementation, optimal allocation rate determiner 610 may perform the following steps (e.g., when determining whether to admit or deny connection request 410 and when determining how much bandwidth to allocate to an admitted connection):
1. If $0 \leq \text{Uses\_C}^i \leq T_{min}^i$
   a. If $\text{MBR} \leq \text{Avail\_C}^i$, then admit the connection and allocate MBR.
   b. Else if $\text{VBR}^i \leq \text{Avail\_C}^i$, then admit the connection and allocate $\text{VBR}^i$.
   c. Else if $\text{GBR} \leq \text{Avail\_C}^i$, then admit the connection and allocate GBR.
   d. Else if no resources are available to allocate the GBR for the connection, check if resources are available to allocate the GBR in other lower QoS classes, starting from the lowest class. If the resources are available, admit the connection and allocate the GBR.
   e. Else if no resources are available for GBR allocation, reject the connection request.
2. Else if $T_{min}^i < \text{Used\_C}^i \leq T_{mid}^i$, then go to Step 1b.
3. Else if $T_{mid}^i < \text{Used\_C}^i \leq T_{max}^i$, then go to Step 1c.
4. Else if $\text{Used\_C}^i > T_{mid}^i$, then go to Step 1d.

In Step 1, optimal allocation rate determiner 610 may monitor how much capacity is being used (e.g., by network 100) and how much capacity is available (e.g., in network 100) for each QoS class (i). If the used capacity is less than or equal to the minimum threshold ($T_{min}$), optimal allocation rate determiner 610 may attempt to allocate the MBR to the connection if available (Step 1a); then may attempt to allocate the VBR to the connection if available (Step 1b); and then may attempt to allocate the GBR to the connection if available (Step 1c). If no resources are available to allocate the GBR at the minimum for the QoS class (i), optimal allocation rate determiner 610 may check if resources are available from other lower QoS classes, starting, for example, from the lowest QoS class. If resources from the other lower QoS classes are available, optimal allocation rate determiner 610 may admit the connection and may allocate the GBR to the connection (Step 1d). If resources from the other lower QoS classes are not available, optimal allocation rate determiner 610 may reject the connection request (Step 1e).

In Step 2, optimal allocation rate determiner 610 may determine whether the used capacity is greater than the minimum threshold ($T_{min}$) and less than or equal to the medium threshold ($T_{mid}$). If the used capacity is greater than the minimum threshold ($T_{min}$) and less than or equal to the medium threshold ($T_{mid}$), optimal allocation rate determiner 610 may execute steps 1b to 1e (e.g., attempt to allocate the VBR if available and then attempt to allocate the GBR if available). If the used capacity is greater than the medium threshold ($T_{mid}$), optimal allocation rate determiner 610 may proceed to step 3.

In Step 3, optimal allocation rate determiner 610 may determine whether the used capacity is greater than the medium threshold ($T_{mid}$) and less than or equal to the maximum threshold ($T_{max}$). If the used capacity is greater than the medium threshold ($T_{mid}$) and less than or equal to the maximum threshold ($T_{max}$), optimal allocation rate determiner 610 may execute steps 1c to 1e. If the used capacity is greater than the maximum threshold ($T_{max}$), optimal allocation rate determiner 610 may proceed to step 4.

In Step 4, optimal allocation rate determiner 610 may check if resources are available from the other lower QoS classes, starting from the lowest QoS class. If resources from the other lower QoS classes are available, optimal allocation rate determiner 610 may admit the connection and may allocate the GBR to the connection (Step 1d). If resources from the other lower QoS classes are not available, optimal allocation rate determiner 610 may reject the connection request (Step 1e).

Although FIG. 6 shows example functional components of PCRF 136, in other implementations, PCRF 136 may contain fewer functional components, different functional components, differently arranged functional components, or additional functional components than depicted in FIG. 6. Additionally, or alternatively, one or more functional components of PCRF 136 may perform one or more other tasks described as being performed by one or more other functional components of PCRF 136.

FIGS. 7A and 7B are flow charts of an example process 700 for performing flow-based proactive connection admission control in wireless networks according to implementations described herein. In one implementation, process 700 may be performed by PCRF 136. In another implementation, some or all of process 700 may be performed by another device or group of devices, including or excluding PCRF 136.

As shown in FIG. 7A, process 700 may include receiving available capacity (Avail_$C^i$) and used capacity (Used_$C^i$) associated with a network (block 705), and receiving a connection request from a user device in the network (block 710). For example, in implementations described above in connection with FIG. 4, UE 110 may provide connection request 410 to PCRF 136, and PCRF 136 may receive connection request 410. Connection request 410 may include a request to connect (e.g., in order to place a call, access the Internet, etc.) to a network (e.g., network 100), QoS requirements for the connection, etc. PCRF 136 may receive resource information 420 (e.g., associated with network 100), capacity information 430 (e.g., associated with network 100), and other inputs 440. Resource information 420 may include information associated with resources of network 100, such as make and model information associated with components of network 100, access technology utilized by LTE network 120, etc. Capacity information 430 may include available capacity associated with resources of network 100, used capacity associated with resources of network 100, total capacity associated with resources of network 100, etc.

As further shown in FIG. 7A, process 700 may include utilizing the available capacity, the used capacity, a minimum threshold ($T_{min}$), a medium threshold ($T_{mid}$), and/or a maximum threshold ($T_{max}$) to determine whether to admit or deny the connection request (block 715). For example, in implementations described above in connection with FIG. 6, capacity monitor 600 of PCRF 136 may determine total capacity (Total_C) 615 of resources in network 100, used capacity (Used_C) 620 of resources in network 100, and available capacity (Avail_C) 625 of resources in network 100. Capacity monitor 600 may provide total capacity 615, used capacity 620, and available capacity 625 to optimal allocation rate determiner 610. Threshold determiner 605 of PCRF 136 may receive threshold input 630 (e.g., from an operator), and may determine minimum capacity threshold ($T_{min}$) 635, medium capacity threshold ($T_{mid}$) 640, and maximum capacity threshold ($T_{max}$) 645 based on threshold input 630. Threshold determiner 605 may provide minimum capacity threshold 635, medium capacity threshold 640, and maximum capacity threshold 645 to optimal allocation rate determiner 610. Based on the received information, optimal allocation rate determiner 610 may determine whether to admit or deny connection request 410, and (if connection request 410 is to be admitted) may determine an optimal bit rate (R) to allocate to connection request 410.

Returning to FIG. 7A, if the used capacity is less than or equal to the minimum threshold (block 720—YES), process 700 may include determining whether a MBR is less than or equal to the available capacity (block 725). If the MBR is less than or equal to the available capacity (block 725—YES), the connection request may be admitted and the MBR may be allocated to the connection request (block 730). For example, in implementations described above in connection with FIG. 6, when used capacity (Used_C) 620 is greater than or equal to zero (0) and less than or equal to minimum capacity threshold ($T_{min}$) 635, optimal allocation rate determiner 610 may admit connection request 410 and may attempt to allocate as much bandwidth as possible (e.g., R=MBR) to connection request 410 (e.g., if the MBR is less than or equal to available capacity (Avail_C) 625), as indicated by reference number 650.

As further shown in FIG. 7A, if the used capacity is greater than the minimum threshold (block 720—NO), process 700 may include determining whether the used capacity is less than or equal to the medium threshold (block 735). If the used capacity is less than or equal to the medium threshold (block 735—YES) (or if block 725—NO), process 700 may include determining whether a VBR is less than or equal to the available capacity (block 740). If the VBR is less than or equal to the available capacity (block 740—YES), the connection request may be admitted and the VBR may be allocated to the connection request (block 745). For example, in implementations described above in connection with FIG. 6, when used capacity (Used_C) 620 is greater than minimum capacity threshold ($T_{min}$) 635 and less than or equal to medium capacity threshold ($T_{mid}$) 640, optimal allocation rate determiner 610 may admit connection request 410 and may allocate bandwidth (e.g., to connection request 410) at a variable bit rate (e.g., R=VBR) (e.g., if the VBR is less than or equal to available capacity (Avail_C) 625), as indicated by reference number 655.

Returning to FIG. 7A, if the used capacity is greater than the medium threshold (block 735—NO), process 700 may include determining whether the used capacity is less than or equal to the maximum threshold (block 750). If the used capacity is less than or equal to the maximum threshold (block 750—YES) (or if block 740—NO), process 700 may include determining whether a GBR is less than or equal to the available capacity (block 755). If the GBR is less than or equal to the available capacity (block 755—YES), the connection request may be admitted and the GBR may be allocated to the connection request (block 760). For example, in implementations described above in connection with FIG. 6, when used capacity (Used_C) 620 is greater than maximum capacity threshold ($T_{max}$) 645, optimal allocation rate determiner 610 may determine if other (e.g., lower QoS) classes of network 100 have available resources to permit connection request 410. If the lower QoS classes of network 100 have resources available, optimal allocation rate determiner 610 may admit connection request 410 and may allocate bandwidth (e.g., to connection request 410) at the GBR (e.g., if the GBR is less than or equal to the available capacity of the lower QoS classes of network 100), as indicated by reference number 665.

As shown in FIGS. 7A and 7B, if the used capacity is greater than the maximum threshold (block 750—NO) or the GBR is greater than the available capacity (block 755—NO), process 700 may include determining whether a particular QoS class (i) is equal to a total number (N) of QoS classes associated with the network (block 765). If the particular QoS class equals the number of QoS classes (block 765—YES), the connection request may be denied (block 770). For example, in implementations described above in connection with FIG. 6, optimal allocation rate determiner 610 may determine if other (e.g., lower QoS) classes of network 100 have available resources to permit connection request 410. If the lower QoS classes of network 100 do not have resources available, optimal allocation rate determiner 610 may deny connection request 410, as indicated by reference number 670.

As further shown in FIG. 7B, if the particular QoS class does not equal the number of QoS classes (block 765—NO), process 700 may include setting a variable (k) to a value of one (block 775), and determining whether the GBR is less than or equal to an available capacity (Avail_$C^{N-k}$) of lower QoS classes of the network (block 780). If the GBR is less than or equal to the available capacity of the lower QoS classes (block 780—YES), process 700 may return to block 760 (FIG. 7A). Otherwise (block 780—NO), process 700 may include incrementing the variable (k) by one (block 785) and determining if the particular QoS class (i) is equal to the number (N) of QoS classes minus the variable (k) (block 790). If the particular QoS class (i) is equal to the number (N) of QoS classes minus the variable (k) (block 790—YES), the connection request may be denied (block 770). Otherwise (block 790—NO), process 700 may return to block 780).

For example, in implementations described above in connection with FIG. 6, if no resources are available to allocate the GBR at the minimum for the QoS class (i), optimal allocation rate determiner 610 may check if resources are available from other lower QoS classes, starting from the lowest QoS class. If resources from the other lower QoS classes are available, optimal allocation rate determiner 610 may admit the connection and may allocate the GBR to the connection (Step 1d). If resources from the other lower QoS classes are not available, optimal allocation rate determiner 610 may reject the connection request (Step 1e).

Implementations described herein may provide systems and/or methods that guarantee QoS for connections (e.g., in a network) while making efficient use of resources in the network. The systems and/or methods may allocate a MBR if bandwidth usage is low (e.g., much less than a bandwidth capacity allocated by a network), and may allocate a minimum rate or GBR if bandwidth usage is high (e.g., near the bandwidth capacity allocated by the network). For bandwidth usage between the low and high thresholds, the systems and/ or methods may determine an allocation rate based on a decreasing relationship between a bandwidth allocation rate and a used bandwidth capacity. If network resources are no longer available in a QoS class, the systems and/or methods may not reject a connection request, but instead may determine whether network resources are available from lower QoS classes and may allocate a GBR, if available. If network resources from the lower QoS classes are not available, the systems and/or methods may reject the connection.

Next generation wireless networks are expected to support high-speed services with different QoS and their respective traffic profiles. The high-speed services may include multimedia services that need real-time QoS guarantees (e.g., since these multimedia services may have diverse bandwidth and performance requirements). To achieve this goal, QoS provisioning may be necessary. The CAC method described herein may be pivotal to enabling efficient system resource utilization, while ensuring satisfaction of connection-level QoS requirements.

The CAC method described herein may provide QoS guarantees, better user experience, cost savings, and/or higher network utilization. High-speed real-time applications must meet certain levels of bandwidth and performance requirements. Therefore, it may be necessary implement the CAC method in a network so that, once a connection request is granted, the network can guarantee a level of QoS required for the connection (or application). The CAC method described herein may ensure a required level of QoS (e.g., bandwidth, latency, jitter, packet loss ratio, etc.) for the connection, and may provide a much better user experience for real-time applications (e.g., voice, video, etc.). Allocating network resources at a peak rate may over-provision, while allocating resources at the guaranteed rate (or minimum required rate) may fail to take advantage of available network resources. The CAC method described herein may allocate a MBR, a GBR, and rates between the MBR and the GBR, in real-time, depending on network resource availability. Thus, the CAC method described herein may provide QoS guarantees and may maximize network utilization (e.g., providing network cost savings).

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 7A and 7B, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, by the computing device, available capacity and used capacity associated with a network;
   receiving, by the computing device, a connection request from a user device in the network;
   receiving, by the computing device, a maximum capacity threshold associated with the network;
   calculating, by the computing device, a minimum capacity threshold and a medium capacity threshold, associated with the network, based on the maximum capacity threshold;
   determining, by the computing device, whether to admit or deny the connection request based on the available capacity, the used capacity, the minimum capacity threshold, the medium capacity threshold, and the maximum capacity threshold; and
   allocating, by the computing device and when the connection request is to be admitted, a particular bit rate, for a particular quality of service (QoS) class, to the connection request based on the available capacity and the used capacity, and based on at least one of the minimum capacity threshold, the medium capacity threshold, or the maximum capacity threshold.

2. The computing device-implemented method of claim 1, further comprising:
   determining whether the used capacity is less than or equal to the minimum capacity threshold;
   determining whether a maximum bit rate is less than or equal to the available capacity;
   admitting the connection request when the used capacity is less than or equal to the minimum capacity threshold and the maximum bit rate is less than or equal to the available capacity; and
   allocating the maximum bit rate to the connection request when the used capacity is less than or equal to the minimum capacity threshold and the maximum bit rate is less than or equal to the available capacity.

3. The computing device-implemented method of claim 1, further comprising:
   determining whether the used capacity is greater than the minimum capacity threshold and less than or equal to the medium capacity threshold;
   determining whether a variable bit rate is less than or equal to the available capacity;
   admitting the connection request when:
      the used capacity is greater than the minimum capacity threshold and less than or equal to the medium capacity threshold, and
      the variable bit rate is less than or equal to the available capacity; and allocating the variable bit rate to the connection request when:
      the used capacity is greater than the minimum capacity threshold and less than or equal to the medium capacity threshold, and
      the variable bit rate is less than or equal to the available capacity.

4. The computing device-implemented method of claim 1, where the variable bit rate is one of:
   a linearly decreasing function,
   a logarithmically decreasing function, or
   an exponentially decreasing function.

5. The computing device-implemented method of claim 1, further comprising:
   determining whether the used capacity is greater than the medium capacity threshold and less than or equal to the maximum capacity threshold;
   determining whether a guaranteed bit rate is less than or equal to the available capacity;
   admitting the connection request when:
      the used capacity is greater than the medium capacity threshold and less than or equal to the maximum capacity threshold, and
      the guaranteed bit rate is less than or equal to the available capacity; and allocating the guaranteed bit rate to the connection request when:
      the used capacity is greater than the medium capacity threshold and less than or equal to the maximum capacity threshold, and
      the guaranteed bit rate is less than or equal to the available capacity.

6. The computing device-implemented method of claim 1, further comprising:
   determining whether the used capacity is greater than the maximum capacity threshold;
   determining whether a guaranteed bit rate is less than or equal to an available capacity of a QoS class lower than the particular QoS class;
   admitting the connection request when:
      the used capacity is greater than the maximum capacity threshold, and
      the guaranteed bit rate is less than or equal to the available capacity of the lower QoS class; and
   allocating the guaranteed bit rate to the connection request when:
      the used capacity is greater than the maximum capacity threshold, and
      the guaranteed bit rate is less than or equal to the available capacity of the lower QoS class.

7. The computing device-implemented method of claim 6, further comprising:
   denying the connection request when there are no resources available in the network for the lower QoS class.

8. The computing device-implemented method of claim 6, further comprising:
   denying the connection request when:
      the used capacity is greater than the maximum capacity threshold, and
      the guaranteed bit rate is greater than the available capacity of the lower QoS class.

9. The computing device-implemented method of claim 1, where the computing device comprises a policy and charging rule function (PCRF) device.

10. The computing device-implemented method of claim 1, where the connection request includes QoS requirements and method further comprises:
    admitting the connection request when the particular QoS class matches the QoS requirements of the connection request.

11. The computing device-implemented method of claim 1, where the determination of whether to admit or deny the connection request is based on availability of resources in the network.

12. The computing device-implemented method of claim 1, where:
    the minimum capacity threshold indicates that the used capacity is substantially less than the available capacity,
    the medium capacity threshold indicates that the used capacity is less than the available capacity, and
    the maximum capacity threshold indicates that the used capacity is almost equal to the available capacity.

13. The computing device-implemented method of claim 1, where the determination of whether to admit or deny the connection request is applied to each QoS class of a plurality of QoS classes associated with the network.

14. A device, comprising:
    a memory to store a plurality of instructions; and
    a processor to execute instructions in the memory to:
       receive available capacity and used capacity associated with a network,
       receive a connection request from a user device in the network,
       receive a maximum capacity threshold associated with the network,
       calculate a minimum capacity threshold and a medium capacity threshold,
    associated with the network, based on the maximum capacity threshold,
       determine whether to admit or deny the connection request based on the available capacity, the used capacity, the minimum capacity threshold, the medium capacity threshold, and the maximum capacity threshold, and
       allocate, when the connection request is to be admitted and based on resource availability associated with the network, a particular bit rate, for a particular quality of service (QoS) class, to the connection request.

15. The device of claim 14, where, when allocating the particular bit rate, the processor is further to execute instructions in the memory to:
    allocate the particular bit rate to the connection request based on one or more of the available capacity, the used capacity, the minimum capacity threshold, the medium capacity threshold, or the maximum capacity threshold.

16. The device of claim 14, where the device comprises a policy and charging rule function (PCRF) device.

17. The device of claim 14, where the connection request includes QoS requirements and the processor is further to execute instructions in the memory to:
    admit the connection request when the particular QoS class matches the QoS requirements of the connection request.

18. The device of claim 14, where the determination of whether to admit or deny the connection request is applied to each QoS class of a plurality of QoS classes associated with the network.

19. The device of claim 14, where the processor is further to execute instructions in the memory to:
    admit the connection request when the used capacity is less than or equal to the minimum capacity threshold and a maximum bit rate is less than or equal to the available capacity, and
    allocate the maximum bit rate to the connection request when the used capacity is less than or equal to the minimum capacity threshold and the maximum bit rate is less than or equal to the available capacity.

20. The device of claim 14, where the processor is further to execute instructions in the memory to:
    admit the connection request when:
       the used capacity is greater than the minimum capacity threshold and less than or equal to the medium capacity threshold, and a variable bit rate is less than or equal to the available capacity, and allocate the variable bit rate to the connection request when:
the used capacity is greater than the minimum capacity threshold and less than or equal to the medium capacity threshold, and
the variable bit rate is less than or equal to the available capacity.

21. The device of claim 14, where the processor is further to execute instructions in the memory to:
admit the connection request when:
the used capacity is greater than the medium capacity threshold and less than or equal to the maximum capacity threshold, and
a guaranteed bit rate is less than or equal to the available capacity, and allocate the guaranteed bit rate to the connection request when:
the used capacity is greater than the medium capacity threshold and less than or equal to the maximum capacity threshold, and
the guaranteed bit rate is less than or equal to the available capacity.

22. The device of claim 14, where the processor is further to execute instructions in the memory to:
determine whether a guaranteed bit rate is less than or equal to an available capacity of a QoS class lower than the particular QoS class;
admit the connection request when:
the used capacity is greater than the maximum capacity threshold, and
the guaranteed bit rate is less than or equal to the available capacity of the lower QoS class, and
allocate the guaranteed bit rate to the connection request when:
the used capacity is greater than the maximum capacity threshold, and
the guaranteed bit rate is less than or equal to the available capacity of the lower QoS class.

23. The device of claim 22, where the processor is further to execute instructions in the memory to:
deny the connection request when there are no resources available in the network for the lower QoS class.

24. The device of claim 22, where the processor is further to execute instructions in the memory to:
deny the connection request when:
the used capacity is greater than the maximum capacity threshold, and
the guaranteed bit rate is greater than the available capacity of the lower QoS class.

25. A device, comprising:
means for receiving available capacity and used capacity associated with a network;
means for receiving a connection request from a user device in the network;
means for receiving a maximum capacity threshold associated with the network;
means for calculating a minimum capacity threshold and a medium capacity threshold, associated with the network, based on the maximum capacity threshold;
means for determining whether to admit or deny the connection request based on the available capacity, the used capacity, the minimum capacity threshold, the medium capacity threshold, and the maximum capacity threshold; and
means for allocating, when the connection request is to be admitted, a particular bit rate, for a particular quality of service (QoS) class, to the connection request based on one or more of the available capacity, the used capacity, the minimum capacity threshold, the medium capacity threshold, or the maximum capacity threshold.

* * * * *